Sept. 14, 1926. 1,599,647
H. F. CLARK
METHOD AND APPARATUS FOR MAKING SHEET GLASS
Filed July 22, 1924   5 Sheets-Sheet 1

INVENTOR
Henry F. Clark

Sept. 14, 1926.
H. F. CLARK
1,599,647
METHOD AND APPARATUS FOR MAKING SHEET GLASS
Filed July 22, 1924    5 Sheets-Sheet 2
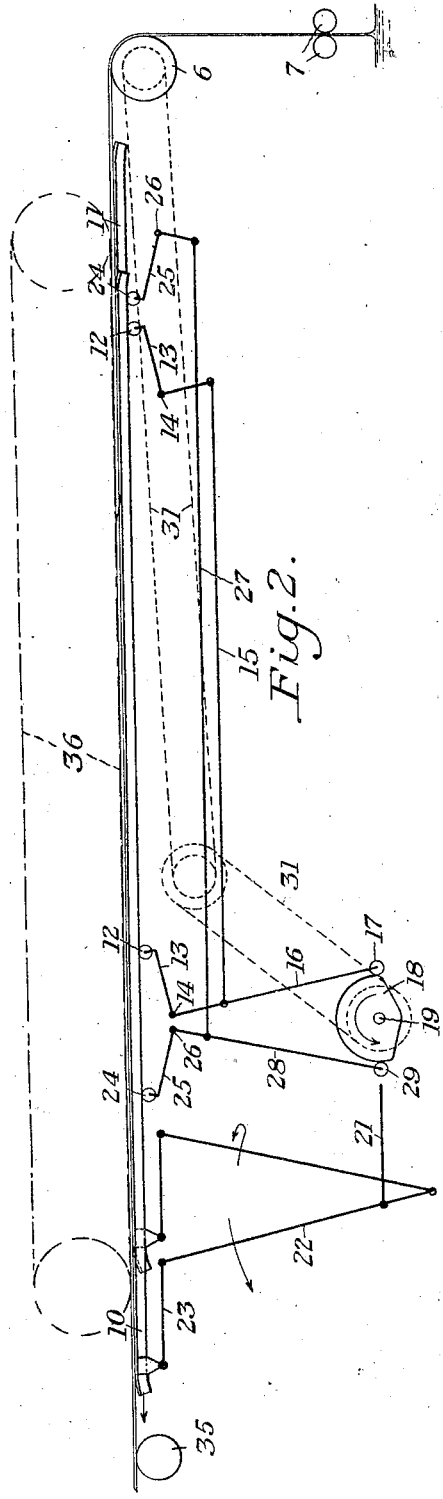
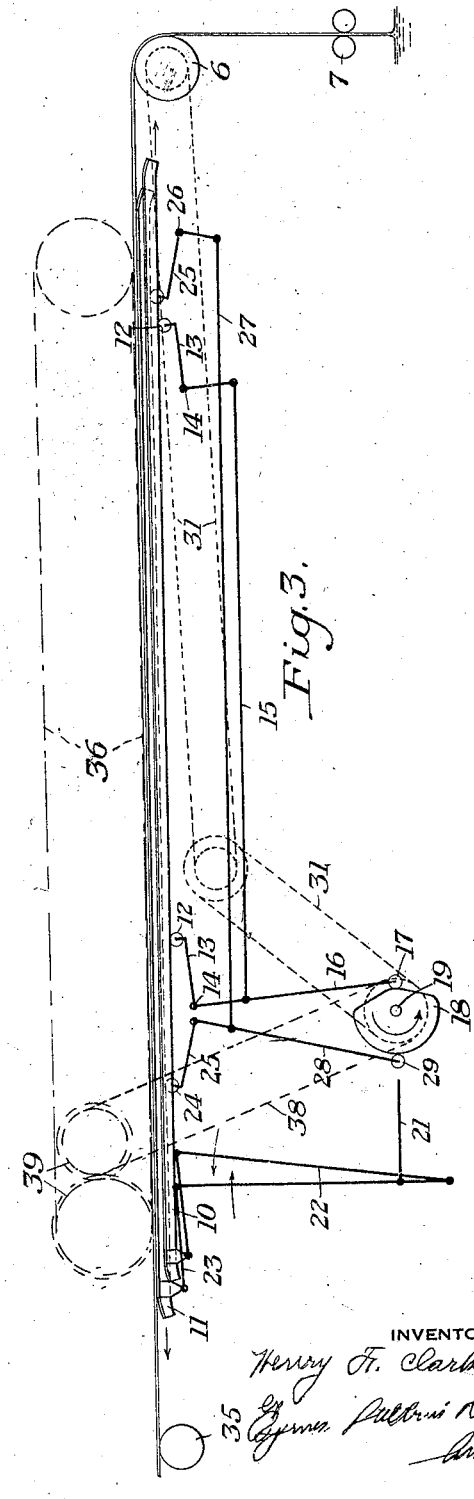
INVENTOR Sept. 14, 1926. 1,599,647
H. F. CLARK
METHOD AND APPARATUS FOR MAKING SHEET GLASS
Filed July 22, 1924 5 Sheets-Sheet 3
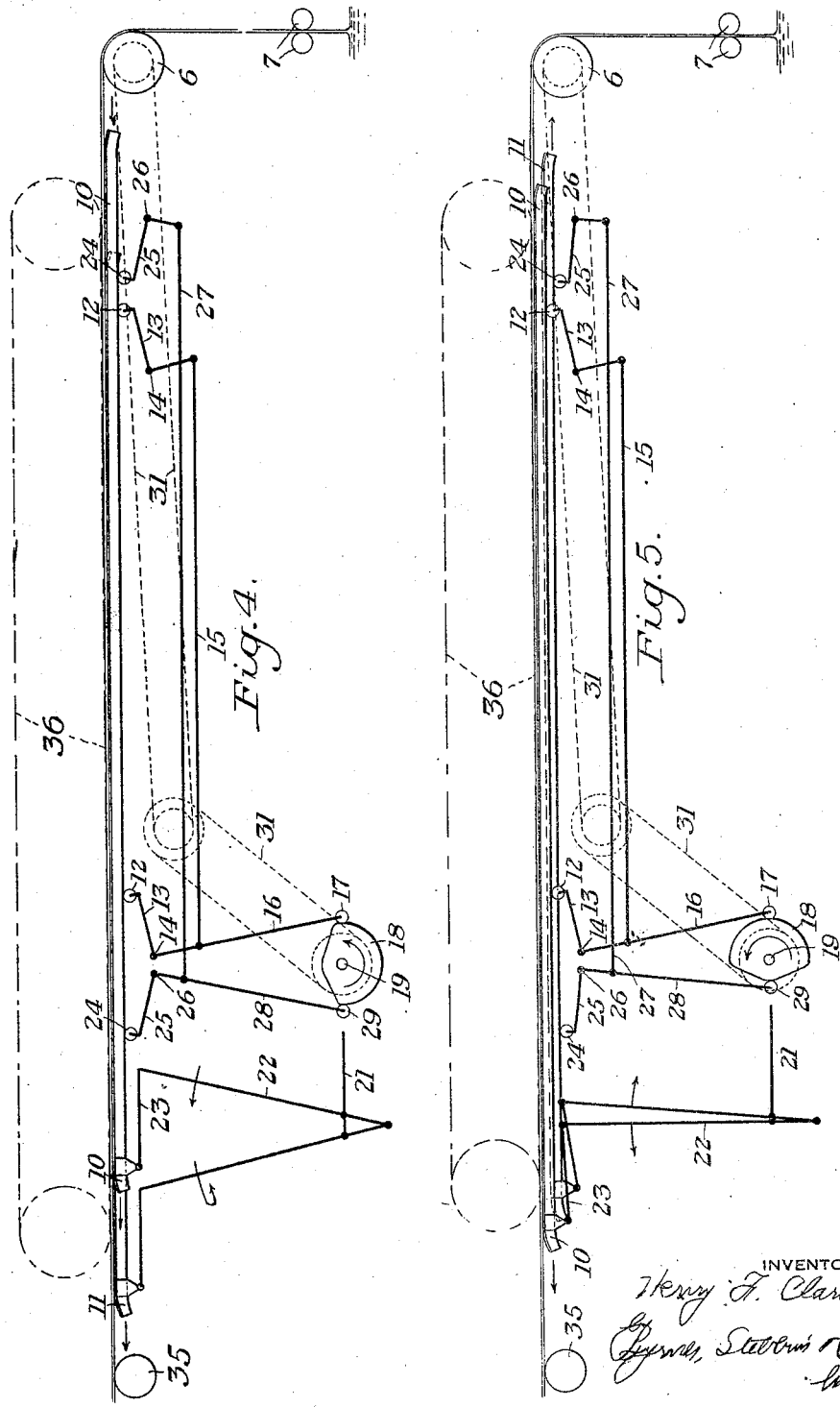

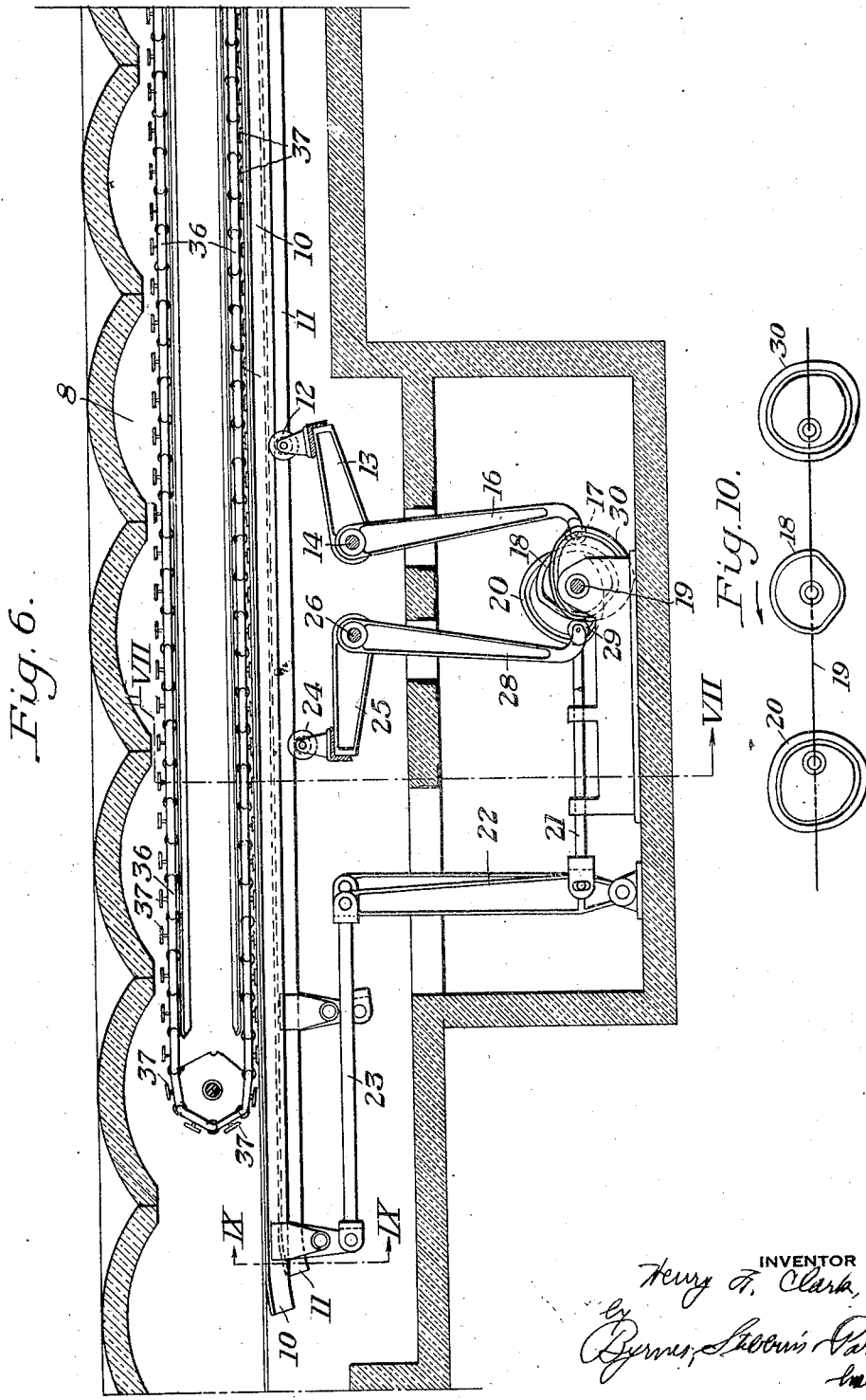

Patented Sept. 14, 1926.

1,599,647

UNITED STATES PATENT OFFICE.

HENRY F. CLARK, OF BELLE VERNON, PENNSYLVANIA, ASSIGNOR TO WINDOW GLASS MACHINE COMPANY, OF PITTSBURGH, PENNSYLVANIA, A CORPORATION OF NEW JERSEY.

METHOD AND APPARATUS FOR MAKING SHEET GLASS.

Application filed July 22, 1924. Serial No. 727,442.

This invention relates to a method and apparatus for making sheet glass, and is particularly applicable to apparatus wherein a glass sheet is drawn upwardly from a molten bath and passed over a bending roll into an annealing leer.

Various methods and apparatus for advancing and stretching the glass sheet have been proposed, but are open to objections, such as injuring the quality of the glass by marking it where it comes in contact with the apparatus. The apparatus employed has also been complicated, expensive and liable to get out of order.

In my improved system, I provide for advancing the glass sheet by successively engaging different strip portions of the sheet, such strip portions extending substantially longitudinally of the sheet. The apparatus preferably comprises a plurality of longitudinally extending bars which are moved into engagement with the glass sheet to carry it forwardly, and are then moved out of contact with the sheet and carried backwardly. A plurality of sets of bars are provided so that the sheet is always engaged by at least one set of contact bars, and is therefore advanced smoothly and regularly. The apparatus is simple and substantial and is effective for advancing and stretching the glass sheet after it passes over the bending roll.

If desired, the bending roll may be driven at the same peripheral speed as the linear speed of the glass, in order to reduce bending roll marks on the product. The entire apparatus is preferably driven from a single power source so that the proper timing of the various parts is assured.

In the accompanying drawings, which illustrate the present preferred embodiment of the invention,—

Figure 1 is a vertical longitudinal section through a forehearth and connected leer tunnel embodying my invention;

Figures 2 to 5, inclusive, are diagrammatic views illustrative of the invention;

Figure 6 is a vertical longitudinal section through a portion of the leer tunnel leading to the left of the apparatus as shown in Figure 1;

Figure 10 is a diagrammatic view of the cam shaft and cams used for driving the various parts of the apparatus.

Figure 1:
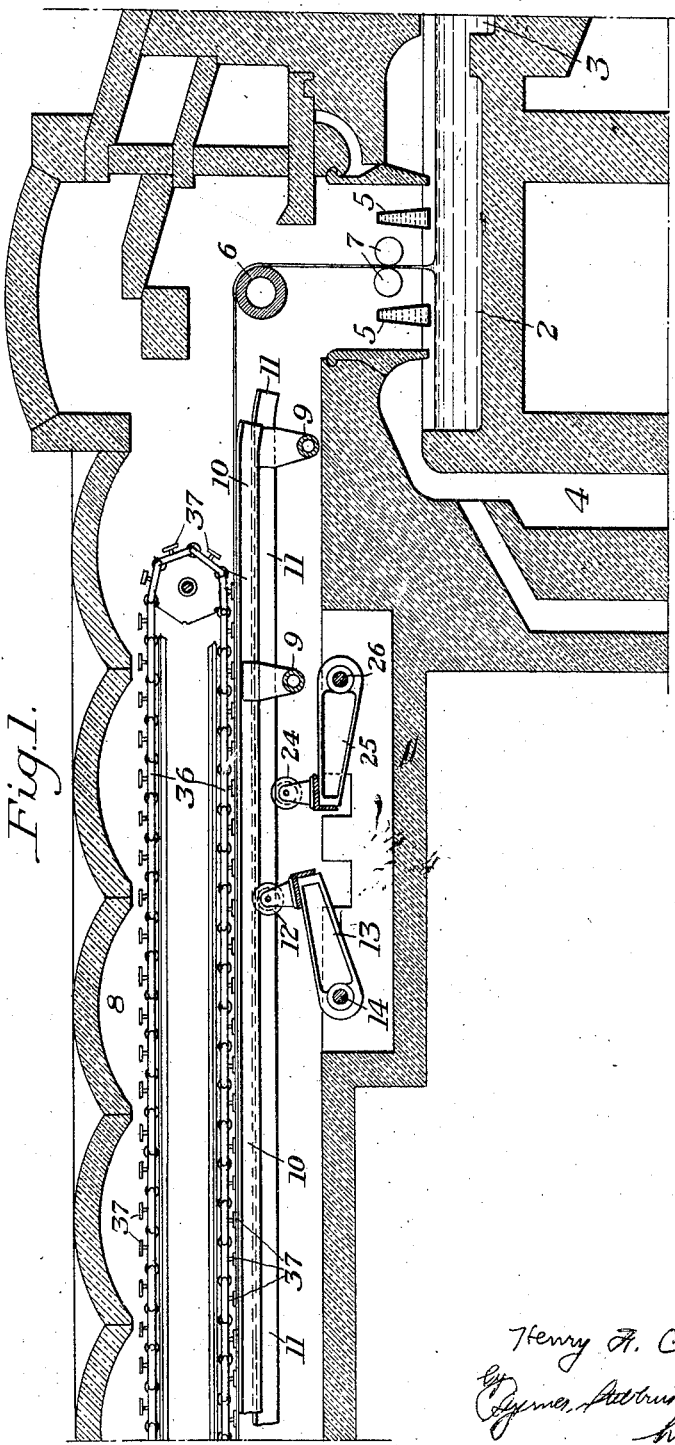

Referring to Figure 1, 2 is a drawing forehearth supplied with molten glass from a tank furnace 3. The forehearth is heated from the furnace 3 and also by a heating flue 4 adapted to direct heat onto the glass in the forehearth remote from the furnace. Coolers 5 are shown for suitably regulating the temperature of the glass adjacent the drawing zone. A bending roll 6 and edge rolls 7 of any desired construction are also provided. This apparatus may be of any desired character, as the invention lies particularly in the means for advancing the glass sheet.

The bending roll 6 serves to change the direction of travel of a glass sheet drawn from the forehearth 2, the sheet, after it passes over the bending roll, being carried in a generally horizontal direction into a leer tunnel 8 of sufficient length to suitably anneal the glass.

In the leer tunnel 8 I provide a plurality of contact bars secured by cross members 9 into a plurality of sets 10 and 11, the bars of which alternate across the width of the leer tunnel. The contact bars 10 are mounted on rollers 12 which in turn are supported by arms 13 mounted on substantially horizontal shafts 14. The shafts 14 are connected together by a linkage 15, so that they move simultaneously, and one of them is provided with an arm 16 having a roller 17 which makes contact with a cam 18 mounted on a shaft 19. As the shaft 19 is rotated, the arms 13 are moved up and down, and the contact bars 10 correspondingly raised or lowered. The contact bars 10 are reciprocated by a cam 20 mounted on the shaft 19 with which engages a roller on a slide bar 21 connected to a lever 22 (Figure 6). The lever 22 is connected to the contact bars 10 by a link 23, and transmits the movement of the cam to the contact bars.

As shown in Figure 10 the cams 18 and 20 are fixed in such relation on the shaft 19 that movement of the contact bars 7 to the left, as viewed in Figure 1, occurs when the bars are in their upper position, and in contact with the lower face of glass sheet. The design of the cam 20 is such that while the bars are in contact with the glass, the forward motion of the glass is at uniform velocity. The design of the cam 20 is also such that the forward motion occupies more than 180 degrees of revolution of the shaft 19, the remaining portion of the cam constituting a quick return motion for the bars.

The contact bars 11 are similarly mounted on rollers 24 carried by arms 25 mounted on shafts 26 and connected by linkage 27. A lever 28 provided with a follower roll 29 makes operative engagement with the cam 18, and as shown in Figures 2 to 5, the relative position of the two follower rolls 17 and 29 is such that when one of the sets of contact bars is being raised or lowered, the other is effective for supporting the glass sheet.

The contact bars 11 are reciprocated by a cam 30 operating through mechanism similar to that employed for the contact bars 10, and this cam is also designed to provide a uniform velocity of the bars when they are in contact with the glass and a quick return when they are out of contact with the glass.

Figures 2 to 5 show in diagrammatic form the relative positions of the various portions of the apparatus at different times during a single revolution of the shaft 19. Examination of these figures will show that the glass sheet remains at the same height at all times, the bars moving upwardly to make contact with it, and carrying it at uniform speed. At certain periods, both sets of bars are in contact with the sheet at the same time, as is necessary, of course, in order to effect the change of support from one set to the other without jar. The bars are preferably spaced from the bending roll 6 in order to allow for stretching the glass sheet and removing the wrinkles therefrom. If desired, a chain drive 31 may be provided for driving the bending roll from the shaft 19.

The shaft 19 is driven from a motor 32 by worm gearing, not shown, between the motor and an intermediate shaft 33 which is in turn connected to the shaft 19 through suitable reduction gears 34.

Figure 7:
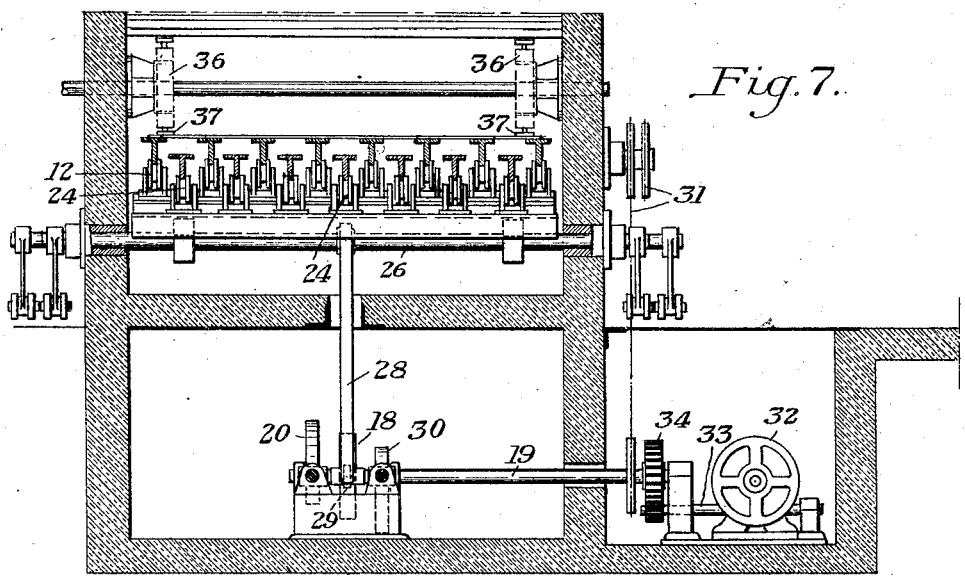
Figure 7 is a section on the line VII—VII of Figure 6.
Figure 8:
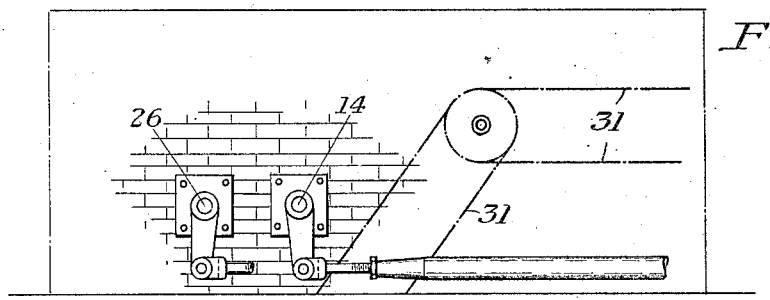
Figure 8 is a side elevation of a portion of the apparatus shown in Figure 7.
Figure 9:
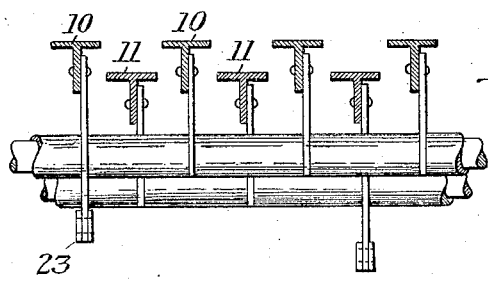
Figure 9 is a section on the line IX—IX of Figure 6.

The contact bars may be conveniently made of metal T-bars, as shown in Figures 7 and 9, and they preferably are of as large area as possible in order to reduce the possibility of marking the glass as it travels through the leer tunnel. If two sets of bars are used, as in the illustrated embodiment of the invention, the combined width of all the bars in each set is substantially half the width of the sheet being drawn, so that the combined width of all the bars is substantially the width of the sheet. The contact bars need not extend the entire length of the leer, and preferably extend only a part of its length. After the glass leaves the bars, it may be supported by rollers 35 driven in any desired manner.

In order to secure the desired flattening action of the apparatus, it is desirable to provide edge clamping means. I preferably employ sprocket chains 36 having contact feet 37 for cooperating with the traveling bars and exerting a clamping action on the sheet edges. The sprocket chains are preferably driven at the same speed as the glass, as by a drive chain 38 and gears 39.

Reference to Figure 7 will show that the contact feet 37 are adapted to cooperate with the outer bars of either set of traveling bars, so the sheet edges will be clamped at all times.

It will be seen that I provide a simple and effective means for advancing and stretching the glass sheet. While the invention is particularly desirable in connection with a bending roll system, it is not limited thereto, as it may be readily applied to other forms of glass drawing apparatus, for while I have shown the preferred embodiment of the invention, it is not limited thereto, but may be otherwise applied within the scope of the following claims.

I claim:

1. Apparatus for making sheet glass, including a tunnel through which drawn glass is adapted to travel, a plurality of bars extending along the direction of travel of the glass, and means for imparting to spaced points on the bars similar orbital movements whereby the bars are at times in contact and are moving with the glass and at other times are out of contact with the glass and moving in an opposite direction, certain of said bars being out of time with other of said bars, the mechanism being arranged to maintain the glass in substantially one plane during its movement along the bars.

2. Apparatus for making sheet glass, including a bath of molten glass, means for drawing a sheet of glass therefrom including bending means adapted to deflect the sheet into a horizontally extending direction, a plurality of bars extending along the direction of travel of the glass after it leaves the deflecting means, and means for imparting to spaced points on the bars similar orbital movements whereby the bars are at times in contact and are moving with the glass and at other times are out of contact with the glass and moving in an opposite direction, the mechanism being arranged to maintain the glass in substantially one plane during its movement along the bars.

3. Apparatus for making sheet glass, including a system for generating a vertically extending sheet of glass, means for deflecting the sheet into a horizontal direction, a plurality of bars extending along the direction of travel of the glass, means for reciprocating the bars, and means for moving the bars into and out of engaging contact with the glass, the mechanism being arranged to maintain the glass in substantially one plane during its movement along the bars.

4. Apparatus for making sheet glass, including a system for generating a vertically extending sheet of glass, means for deflecting the sheet into a horizontal direction, a plurality of bars extending along the direction of travel of the glass, means for reciprocating the bars, and means for moving the bars into and out of engaging contact with the glass, certain of said bars being out of time with other of said bars, the mechanism being arranged to maintain the glass in substantially one plane during its movement along the bars.

5. Apparatus for making sheet glass, including glass drawing means, two sets of bars extending in the direction of travel of the glass, means for reciprocating each set of bars, and means for moving each set of bars into or out of engagement with the glass sheet, the several operating means for the two sets of bars being out of time with one another, the mechanism being arranged to maintain glass in substantially one plane during its movement along the bars.

6. Apparatus for making sheet glass, including means for substantially continuously forming a glass sheet and supplying the same in a horizontally extending direction, a plurality of bars extending in the direction of travel of the sheet, means for reciprocating the bars, and means for moving them into and out of engagement with the traveling sheet, certain of said bars being out of time with other of said bars, the mechanism being arranged to maintain the glass in substantially one plane during its movement along the bars.

7. Apparatus for making sheet glass, including means for generating a glass sheet, a plurality of bars lying in the direction of travel of the sheet, means for reciprocating the bars whereby they travel first in the same direction as the glass and then in the opposite direction, and means for moving the bars into and out of engagement with the glass sheet, certain of the bars being out of time with other bars and the reciprocating means being adapted for a quick return motion of the bars.

8. Apparatus for making sheet glass, including means for substantially continuously generating a glass sheet, a plurality of bars extending along the direction of travel of the sheet, there being at least two bars near each edge portion of such sheet, means for reciprocating the bars, means for moving the two edge bars alternately into and out of engagement with the glass sheet, said edge bars also being out of time with one another in their reciprocatory movement, and edge clamping means cooperating with either of the edge bars.

9. Apparatus for making sheet glass, including means for substantially continuously generating a glass sheet, a bending roll adapted to deflect the sheet into a horizontally extending direction, a plurality of bars extending along the direction of travel of the glass but spaced from the bending roll, and means for moving the bars into engagement with the sheet, then moving with the sheet while such contact is maintained, then out of contact with the sheet, and then in a direction opposite to the travel of the glass sheet the movement of some of said bars being out of time with the movement of other of said bars the mechanism being arranged to maintain the glass in substantially one plane during its movement along the bars.

10. Apparatus for making sheet glass, including means for substantially continuously generating a glass sheet, a bending roll adapted to deflect the sheet into a horizontally extending direction, a plurality of bars extending along the direction of travel of the glass but spaced from the bending roll, means for moving the bars into engagement with the sheet, then moving with the sheet while such contact is maintained, then out of contact with the sheet, and then in a direction opposite to the travel of the glass sheet, the movement of some of said bars being out of time with the movement of other of said bars, and clamping means for a sheet edge.

11. Apparatus for making sheet glass, including means for substantially continuously generating a glass sheet, a bending roll adapted to deflect the sheet into a horizontally extending direction, a plurality of bars extending along the direction of travel of the glass but spaced from the bending roll, means for moving the bars into engagement with the sheet, then moving with the sheet while such contact is maintained, then out of contact with the sheet, and then in a direction opposite to the travel of the glass sheet, the movement of some of said bars being out of time with the movement of other of said bars, and clamping means for a sheet edge, said clamping means comprising contactors on the side of the sheet opposite the side which is engaged by the bars, said contactors being adapted to cooperate with at least two bars which are out of time with one another.

12. Apparatus for making sheet glass, including means for substantially continuously generating a sheet of glass, a plurality of sets of bars extending along the direction of travel of the sheet, means for alternately lifting each set of bars into the plane of travel of the sheet and dropping them therebelow, and means for reciprocating the bars, the mechanism being arranged to maintain the glass in substantially one plane during its movement along the bars.

13. Apparatus for making sheet glass, including means for substantially continuously generating a sheet of glass, a plurality of sets of bars extending along the direction of travel of the sheet, means for alternately lifting each set of bars into the plane of travel of the sheet and dropping them therebelow, and means for reciprocating the bars, the reciprocating means being adapted to cause travel of the bars when in contact with the sheet at a rate corresponding to a desired drawing speed and being adapted to make a return stroke in a shorter period of time.

14. Apparatus for making sheet glass, including means for substantially continuously generating a sheet of glass, a plurality of sets of bars extending along the direction of travel of the sheet, means for alternately lifting each set of bars into the plane of travel of the sheet and dropping them therebelow, means for reciprocating the bars, the reciprocating means being adapted to cause travel of the bars when in contact with the sheet at a rate corresponding to a desired drawing speed and being adapted to make a return stroke in a shorter period of time, and edge clamping means adapted to cooperate with a bar in several of the sets.

In testimony whereof I have hereunto set my hand.

HENRY F. CLARK.